United States Patent [19]
Seo

[11] Patent Number: 5,212,613
[45] Date of Patent: May 18, 1993

[54] ROTARY HEAD DRUM

[75] Inventor: Jung-eon Seo, Euiwang, Rep. of Korea

[73] Assignee: Samsung Electronics Co., Ltd., Kyunggi-do, Rep. of Korea

[21] Appl. No.: 813,659

[22] Filed: Dec. 27, 1991

[30] Foreign Application Priority Data

Dec. 29, 1990 [KR] Rep. of Korea ............... 90-22482

[51] Int. Cl.$^5$ ................... G11B 15/61; G11B 5/027
[52] U.S. Cl. ........................... 360/130.24; 360/84
[58] Field of Search ............ 360/84, 85, 95, 130.23, 360/130.24

[56] References Cited

U.S. PATENT DOCUMENTS

| T941,022 | 12/1975 | Freeman et al. | 360/130.24 |
| 4,249,222 | 2/1981 | Iwasaki | 360/130.23 |
| 4,833,562 | 5/1989 | Kochi et al. | 360/130.24 |
| 4,896,236 | 1/1990 | Usui et al. | 360/130.23 |
| 4,977,473 | 12/1990 | Arai et al. | 360/130.24 |

FOREIGN PATENT DOCUMENTS 52-23908  2/1977  Japan ...................... 360/130.23

Primary Examiner—A. J. Heinz
Assistant Examiner—Jefferson Evans
Attorney, Agent, or Firm—Leydig, Voit & Mayer

[57] ABSTRACT

A rotary head drum having at least one stabilizer installed in a magnetic tape recording and/or reproducing apparatus is described, in which at least one stabilizer is provided to bring about the stability of the traveling of a tape which travels while in contact with the circumferential surface of a drum. The stabilizer has a circular plane of a predetermined diameter, and the circular plane is mounted in a lower fixed drum to be partially in contact with the tape, thereby rotating with the tape at the same linear velocity. The tape only slightly vibrates while traveling in contact with the stabilizer, and travels with stability. Noise due to jitter, wow and flutter caused by the tape vibration is eliminated in the picture and sound. This rotary head drum is utilized in a video cassette recorder, digital audio tape recorder, etc.

4 Claims, 1 Drawing Sheet

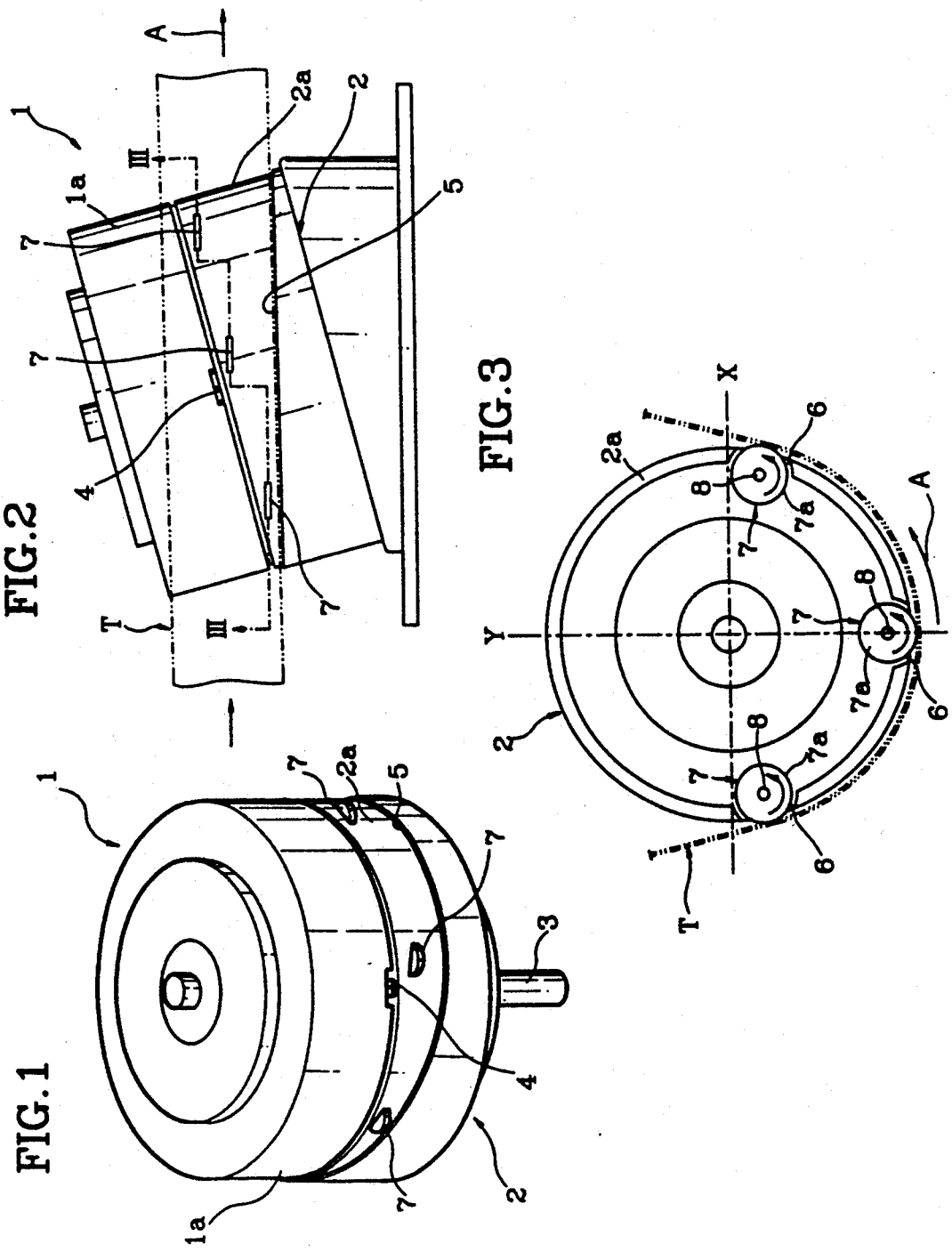

ROTARY HEAD DRUM

BACKGROUND OF THE INVENTION

The present invention relates to a rotary head drum installed in a magnetic tape recording/reproducing apparatus, and particularly to a rotary head drum having a stabilizer for stabilizing the travel of a tape.

In a magnetic tape recording/reproducing apparatus in which a rotary head drum is installed, the recording or reproducing mode is performed such that a tape is drawn out from a tape cassette, and then travels in contact with at least one portion of the rotary head drum's circumferential surface. While this recording or reproducing mode is carried out, if tape vibration occurs (this includes longitudinal vibration in the direction of the tape's width, traversing vibration in the direction of the tape's thickness, and traveling vibration in the direction of the tape's travel), which causes jitter, wow and flutter due to time-base error, thereby deteriorating the recording condition and producing severe noise in the reproduced signal. Especially, longitudinal vibration of the tape causes the scanning path of the head mounted on the rotary head drum to deviate from the signal track of the tape, which in turn affects the envelope of the reproducing signal, causing severe noise.

It is known that an impedance roller is installed in a conventional video tape recorder to prevent the vibration of the tape. Here, the inertia moment of the impedance roller obtained by being rotated while in contact with the tape decreases the high frequency vibration of the tape. However, the impedance roller is installed between the supply reel of the tape and the rotary head drum, which is less effective to prevent the tape from being vibrated on the rotary head drum. Further, since the tape instantaneously contacts the rotary head drum when entering the traveling path, and is instantaneously separated from it while exiting, the tape severely vibrates. Therefore, such vibration is must be further lessened.

To lessen the vibration, a prior art is disclosed in U.S. Pat. No. 4,896,236 entitled "Tape Stabilizer Unit for Stabilizing a Moving Tape in a Tape Recording and/or Reproducing Apparatus." Herein, a stabilizer unit comprising a roller, a circular weight, and a holder for supplying the weight is placed adjacent to a rotary head drum, thereby contriving better stability during the tape's travel. However, since this is also installed separately from the rotary head drum, enough stability to meet the demand in the present invention during the travel of the tape, i.e., the prevention of the tape's vibration on the circumferential surface of the rotary head drum, cannot be expected. Besides, the tape traveling system (particularly tape's loading system) is so complicated that the prior art has disadvantages in several aspects.

SUMMARY OF THE INVENTION

Accordingly, it is the object of the present invention to provide a rotary head drum capable of preventing the vibration of a tape on the circumferential surface thereof, which can achieve high stability of the tape traveling without complicating the tape traveling system.

To achieve these and other objects, there is provided a rotary head drum comprising an upper rotating head drum with a head, and a coaxial lower fixed drum having an inclined tape lead line, thereby carrying out predetermined recording or reproducing operation by a tape which travels while in contact with the circumference of the upper and lower drums by a predetermined rolling angle, wherein at least one stabilizer having a circular plane of a predetermined diameter is provided in the lower fixed drum, such that the circular plane projects from the partially in contact with the tape, and the stabilizer is supported by a pivot to be rotated at the same linear velocity as the traveling speed of the tape.

BRIEF DESCRIPTION OF THE DRAWINGS

Other objects and advantages of the present invention will become more apparent by the following description with reference to accompanying drawings, in which:

FIG. 1 is an external perspective view of a rotary head drum having a stabilizer according to the present invention;

FIG. 2 is a front view showing the rotary head drum of FIG. 1 when installed, and its orientation to a traveling tape; and FIG. 3 is a schematic sectional view shown along line III—III in FIG. 2.

DETAILED DESCRIPTION OF THE INVENTION

A preferred embodiment of the present invention will be described with reference to the accompanying drawings which, for convenience, illustrate a double-helical scantype rotary head drum.

In the drawing, an upper rotating drum 1 and a lower fixed drum 2 are arranged top and bottom about one rotary axis 3. Rotary axis 3 is coupled to upper rotating drum 1 axis 3. Rotary axis 3 is coupled to upper rotating drum 1 by press fit, and is supported by a bearing (not shown) in lower fixed drum 2, thereby rotating with upper rotating drum 1 by a drum motor (not shown) which is mounted under lower fixed drum 2. A head 4 slightly projected from the circumferential surface 1a of upper rotating drum 1 is provided at the lower end of upper rotating drum 1. The circumferential surface 2a of lower fixed drum 2 is stepped aslope, thereby having a tape lead line 5 which guides the traveling of the lower edge of a tape T. The diameter of the circumferential surface 2a which is the upper portion of tape lead line 5 is formed to be the same as that of circumferential surface 1a of upper rotating drum 1. As illustrated in FIG. 2, tape T travels while in contact with both circumferential surfaces 1a and 2a of upper rotating drum 1 and lower rotating drum 2. At this time, in accordance with the rotation of upper rotating drum 1, head 4 begins scanning tape T helically.

According to the present invention, three stabilizers 7 are provided in lower fixed drum 2 of the above-described rotary head drum. As shown in FIG. 3, these stabilizers 7 are disc-shaped having circular planes 7a of the same diameter. Circular planes 7a are slightly projected from circumferential surface 2a through holes 6 formed in circumferential surface 2a of lower fixed drum 2 to be partially in contact with tape T. Also, stabilizers 7 are each supported by pivots 8 to be rotated when circular planes 7a contact tape T which travels in the direction of an arrow A. Here, the circular planes 7a of stabilizers 7 are respectively running parallel with the traveling direction (arrow A) of tape T to be rotated at the same linear velocity as the traveling speed of tape T.

In other words, each axis of stabilizers' pivots 8 are perpendicular to tape lead line 5 of lower fixed drum 2.

Referring to FIG. 3, three stabilizers 7 are installed, wherein two are positioned at both ends of an axis X, corresponding to the start and end points of the drum's contact with tape T, and the remaining one is positioned at the corresponding point of an axis Y, which is the central point between the two stabilizers. Stabilizer 7 can be of any number.

Consequently, stabilizers 7 are arranged at the same height in the slope from the upper end of lower fixed drum 2, such that each stabilizer is horizontally stepped to have a different height with respect to tape lead line 5, thereby uniformly rotating while in contact with tape T. According to the rotary head drum having stabilizers 7 of the present invention, with respect to the traveling vibration of the tape, high-frequency vibration of tape T is prevented by the turning moment due to the stabilizer's mass.

With respect to vibration in the direction of the tape's width (longitudinal vibration), circular planes 7a of stabilizers 7 function as a guide for the travel of tape T, so that, in particular, a plurality of stabilizers 7 are arranged to be evenly in contact with top to bottom of tape T, preventing longitudinal vibration of the tape.

With respect to vibration in the direction of the tape's thickness (traversal vibration), since the instantaneous contact and separation of tape T are softened by two stabilizers 7 on either side and positioned at the start and end points of contact between tape T and circumferential sides 1a and 2a of rotary head drum 1 and 2, traversal vibration is markedly decreased. Thus, longitudinal vibration, traversal vibration, or traveling vibration rarely occur in the rotary head drum according to the present invention, resulting in markedly decreased noise in the recording or reproducing signal, primarily, jitter, wow & flutter, etc., which is due to time-base error.

In stabilizers according to the present invention, portions of circumferential surfaces 7a should be less projected than head 4 so as not to affect its recording/reproducing operation. Here, it is preferable that the projected length of head 4 be 10 to 20 $\mu$m from circumferential surface 2a of lower fixed drum 2, while the projected length should be 30 to 45 $\mu$m from circumferential surface 1a of upper rotating drum 1, in the conventional double-helical scanning system.

In the present invention as described above, a rotary head drum having at least one stabilizer is provided to bring about stability of the tape's traveling. Here, tape vibration on the rotary head drum is prevented, thereby markedly lowering the jitter and wow & flutter which cause noise during the recording/reproducing of a signal. In particular, the conventional magnetic tape recording/reproducing apparatus can be utilized without changing the tape traveling system. As a result, the present invention is very effective and advantageous in that the rotary head drum is very practical, and also can be adopted to video tape recorders, video cameras, digital audio tape recorders, etc., so that product quality can be enhanced by improving the picture and/or sound quality of the aforesaid appliances.

The present invention is not limited to the particular details of construction of the embodiments depicted and other modifications and applications are contemplated. Certain changes may be made in the above-described process without departing from the true spirit and scope of the invention herein involved.

What is claimed is:

1. A rotary head drum comprising an upper rotating head drum with a head and a lower fixed drum coaxial with said upper rotating head drum and having an inclined tape lead line, thereby carrying out predetermined recording or reproducing operation to/from a tape which travels while in contact with the circumference of said upper and lower drums, wherein at least one stabilizer having a disc plane of a predetermined diameter is provided in said lower fixed drum, such that the disc projects from the circumferential surface of said lower fixed drum to be partially in contact with said tape, and said stabilizer is supported by a pivot to be rotated at the same linear velocity as the traveling speed of said tape.

2. A rotary head drum as claimed in claim 1, wherein the number of said stabilizer is plural, said plurality of stabilizers are arranged around the circumferential surface of said lower fixed drum at equal distances, with one of said plurality of stabilizers positioned on each side of said rotary head drum and arranged in the vicinity of the start and end points of contact between said tape and said rotary head drum.

3. A rotary head drum as claimed in claim 1, wherein said plurality of stabilizers are parallel with said inclined tape lead line, and arranged at different heights.

4. A rotary head drum as claimed in claim 1, wherein the projected length of a head from the circumferential surface of said upper rotating drum is 30 to 45 $\mu$m, and that of said stabilizer from said circumferential surface of said lower fixed drum is 10 to 20 $\mu$m.

* * * * *

UNITED STATES PATENT AND TRADEMARK OFFICE
CERTIFICATE OF CORRECTION

PATENT NO. : 5,212,613

DATED : May 18, 1993

INVENTOR(S) : Jung-eon Seo

It is certified that error appears in the above-identified patent and that said Letters Patent is hereby corrected as shown below:

Claim 1, col. 4, line 26, delete "plane".

Signed and Sealed this

Fourth Day of January, 1994

Attest:

BRUCE LEHMAN

Attesting Officer

Commissioner of Patents and Trademarks